United States Patent
Nos

(10) Patent No.: US 10,534,908 B2
(45) Date of Patent: Jan. 14, 2020

(54) ALERTS BASED ON ENTITIES IN SECURITY INFORMATION AND EVENT MANAGEMENT PRODUCTS

(71) Applicant: SAP SE, Walldorf (DE)

(72) Inventor: Kathrin Nos, Nussloch (DE)

(73) Assignee: SAP SE, Walldorf (DE)

(*) Notice: Subject to any disclaimer, the term of this patent is extended or adjusted under 35 U.S.C. 154(b) by 3 days.

(21) Appl. No.: 15/370,084

(22) Filed: Dec. 6, 2016

(65) Prior Publication Data
US 2018/0157835 A1 Jun. 7, 2018

(51) Int. Cl.
*H04L 29/06* (2006.01)
*G06F 21/55* (2013.01)

(52) U.S. Cl.
CPC .......... *G06F 21/554* (2013.01); *G06F 21/552* (2013.01)

(58) Field of Classification Search
CPC .. H04L 63/20; H04L 63/1441; H04L 63/1425
See application file for complete search history.

(56) References Cited

U.S. PATENT DOCUMENTS

| | | |
|---|---|---|
| 5,440,726 A | 8/1995 | Fuchs |
| 5,960,170 A | 9/1999 | Chen |
| 6,173,418 B1 | 1/2001 | Fujino et al. |
| 6,629,106 B1 | 9/2003 | Narayanaswamy |
| 6,779,001 B1 | 8/2004 | Kanai et al. |
| 7,376,969 B1 | 5/2008 | Njemanze |
| 7,380,205 B2 | 5/2008 | Bezrukov et al. |
| 7,441,197 B2 | 10/2008 | Tschiegg et al. |
| 7,457,792 B2 | 11/2008 | Weigt et al. |
| 7,457,793 B2 | 11/2008 | Weigt et al. |
| 7,457,794 B2 | 11/2008 | Weigt et al. |
| 7,545,969 B2 | 6/2009 | Bennett |
| 7,624,092 B2 | 11/2009 | Lieske et al. |
| 7,627,544 B2 | 12/2009 | Chkodrov |
| 7,756,808 B2 | 7/2010 | Weigt et al. |
| 7,756,809 B2 | 7/2010 | Weigt et al. |
| 7,761,396 B2 | 7/2010 | Weigt et al. |
| 7,783,723 B2 | 8/2010 | Peng et al. |

(Continued)

OTHER PUBLICATIONS

Office Action in related U.S. Appl. No. 15/216,201 dated Mar. 7, 2018; 14 pages.

(Continued)

*Primary Examiner* — Jason K Gee
(74) *Attorney, Agent, or Firm* — Fish & Richardson P.C.

(57) ABSTRACT

An enterprise threat detection (ETD) pattern is executed against received log event data from one or more computing systems. Using the ETD pattern, an event threshold is determined to have been exceeded. Entities associated with an alert created based on the exceeded threshold are determined and, at runtime, a severity value is calculated for each determined entity associated with the alert. A selection is received of a determined entity on which to perform mitigation action activities. Mitigation action activities associated with the determined entity are written into an activity record data record. A mitigation action activity is closed on the determined entity and a determination performed that all mitigation action activities associated with all entities related to the created alert have been closed. The created alert is closed.

20 Claims, 4 Drawing Sheets

(56) References Cited

U.S. PATENT DOCUMENTS

| | | |
|---|---|---|
| 7,788,718 B1 | 8/2010 | Fei |
| 7,872,982 B2 | 1/2011 | Atkins |
| 7,908,660 B2 | 3/2011 | Bahl |
| 7,934,257 B1 | 4/2011 | Kienzle |
| 7,961,633 B2 | 6/2011 | Shankar |
| 7,971,209 B2 | 6/2011 | Eberlein et al. |
| 8,051,034 B2 | 11/2011 | Mehta et al. |
| 8,091,117 B2 | 1/2012 | Williams |
| 8,474,047 B2 | 6/2013 | Adelstein |
| 8,484,726 B1 | 7/2013 | Sutton |
| 8,554,907 B1 | 10/2013 | Chen et al. |
| 8,661,103 B2 | 2/2014 | Mehta et al. |
| 8,775,671 B2 | 7/2014 | Rodeck et al. |
| 8,892,454 B2 | 11/2014 | Rabetge et al. |
| 8,954,602 B2 | 2/2015 | Seifert et al. |
| 8,973,147 B2 | 3/2015 | Pearcy |
| 9,037,678 B2 | 5/2015 | Mehta et al. |
| 9,075,633 B2 | 7/2015 | Nos |
| 9,106,697 B2 | 8/2015 | Capalik et al. |
| 9,116,906 B2 | 8/2015 | Nos et al. |
| 9,148,488 B2 | 9/2015 | Rabetge et al. |
| 9,170,951 B1 | 10/2015 | He |
| 9,251,011 B2 | 2/2016 | Meier et al. |
| 9,262,519 B1 | 2/2016 | Saurabh |
| 9,304,978 B2 | 4/2016 | Bezrukov et al. |
| 9,313,421 B2 | 4/2016 | Deshpande |
| 9,336,385 B1 | 5/2016 | Spencer |
| 9,348,665 B2 | 5/2016 | Storz et al. |
| 9,383,934 B1 | 7/2016 | Likacs |
| 9,419,989 B2 | 8/2016 | Harris |
| 9,524,389 B1 | 12/2016 | Roth |
| 9,619,984 B2 | 4/2017 | Donovan |
| 9,690,931 B1 | 6/2017 | Anantharaju et al. |
| 9,779,147 B1 | 10/2017 | Sherman et al. |
| 9,779,150 B1 | 10/2017 | Sherman |
| 9,843,596 B1 | 12/2017 | Averbuch |
| 9,979,741 B2 | 5/2018 | Fuhrman |
| 1,000,138 A1 | 6/2018 | Das et al. |
| 10,079,842 B1 | 9/2018 | Brandwine et al. |
| 1,010,237 A1 | 10/2018 | Seifert et al. |
| 10,140,447 B2 | 11/2018 | Rahaman et al. |
| 10,148,675 B1 | 12/2018 | Brandwine et al. |
| 2002/0070953 A1 | 6/2002 | Barg |
| 2003/0074471 A1 | 4/2003 | Anderson |
| 2003/0115484 A1 | 6/2003 | Mariconi et al. |
| 2003/0217137 A1 | 11/2003 | Roese |
| 2004/0015481 A1 | 1/2004 | Zinda |
| 2004/0044912 A1 | 3/2004 | Connary |
| 2004/0078490 A1 | 4/2004 | Anderson |
| 2004/0093513 A1 | 5/2004 | Cantrell |
| 2006/0037075 A1 | 2/2006 | Frattura |
| 2006/0059115 A1 | 3/2006 | Gulfleisch et al. |
| 2006/0065594 A1* | 3/2006 | Armstrong ......... B01D 21/0045 210/606 |
| 2006/0106847 A1 | 5/2006 | Eckardt et al. |
| 2006/0161816 A1 | 7/2006 | Gula et al. |
| 2006/0218140 A1 | 9/2006 | Whitney |
| 2006/0253907 A1 | 11/2006 | McConnell |
| 2007/0067438 A1 | 3/2007 | Goranson et al. |
| 2007/0073519 A1 | 3/2007 | Long |
| 2007/0100905 A1 | 5/2007 | Masters et al. |
| 2007/0115998 A1 | 5/2007 | McEligott |
| 2007/0136437 A1 | 6/2007 | Shankar et al. |
| 2007/0183389 A1 | 8/2007 | Clee |
| 2007/0186284 A1 | 8/2007 | McConnell |
| 2007/0266387 A1 | 11/2007 | Henmi |
| 2007/0283192 A1 | 12/2007 | Shevchenko |
| 2007/0300296 A1 | 12/2007 | Kudla |
| 2008/0033966 A1 | 2/2008 | Wahl |
| 2008/0034425 A1 | 2/2008 | Overcash et al. |
| 2008/0080384 A1 | 4/2008 | Atkins |
| 2008/0091681 A1 | 4/2008 | Dwivedi |
| 2008/0163085 A1 | 7/2008 | Subbu et al. |
| 2008/0288889 A1 | 11/2008 | Hunt et al. |
| 2008/0295173 A1 | 11/2008 | Tsvetanov |
| 2008/0320552 A1 | 12/2008 | Kumar |
| 2009/0044277 A1 | 2/2009 | Aaron et al. |
| 2009/0049518 A1 | 2/2009 | Roman |
| 2009/0288164 A1 | 11/2009 | Adelstein |
| 2009/0293046 A1 | 11/2009 | Cheriton |
| 2009/0300045 A1 | 12/2009 | Chaudhry et al. |
| 2009/0312026 A1 | 12/2009 | Parameswar |
| 2010/0011031 A1 | 1/2010 | Huang |
| 2010/0114832 A1 | 5/2010 | Lillibridge |
| 2010/0180325 A1 | 7/2010 | Golobay |
| 2011/0098928 A1 | 4/2011 | Hoffman et al. |
| 2011/0213741 A1 | 9/2011 | Shama |
| 2011/0277034 A1 | 11/2011 | Hanson |
| 2011/0320816 A1 | 12/2011 | Yao |
| 2012/0005542 A1 | 1/2012 | Petersen |
| 2012/0158653 A1 | 6/2012 | Shaffer et al. |
| 2012/0167161 A1 | 6/2012 | Kim et al. |
| 2012/0191660 A1 | 7/2012 | Hoog |
| 2012/0210434 A1* | 8/2012 | Curtis ............... G06F 21/577 726/25 |
| 2012/0271748 A1 | 10/2012 | DiSalvo |
| 2012/0271790 A1 | 10/2012 | Lappas et al. |
| 2012/0317078 A1 | 12/2012 | Zhou et al. |
| 2013/0086023 A1 | 4/2013 | Tsukamoto et al. |
| 2013/0106830 A1 | 5/2013 | de Loera |
| 2013/0198840 A1 | 8/2013 | Drissi et al. |
| 2013/0212709 A1 | 8/2013 | Tucker |
| 2013/0262311 A1 | 10/2013 | Buhrmann |
| 2013/0298243 A1 | 11/2013 | Kumar et al. |
| 2013/0304665 A1 | 11/2013 | Rodeck et al. |
| 2013/0304666 A1 | 11/2013 | Rodeck et al. |
| 2013/0305369 A1 | 11/2013 | Karta |
| 2013/0326079 A1 | 12/2013 | Seifert et al. |
| 2013/0347111 A1 | 12/2013 | Karta |
| 2014/0047413 A1 | 2/2014 | Sheive et al. |
| 2014/0201836 A1 | 7/2014 | Amsler |
| 2014/0223283 A1 | 8/2014 | Hancock |
| 2014/0244623 A1 | 8/2014 | King |
| 2014/0317681 A1 | 10/2014 | Shende |
| 2015/0007325 A1 | 1/2015 | Eliseev |
| 2015/0067880 A1 | 3/2015 | Ward |
| 2015/0073868 A1 | 3/2015 | Garman |
| 2015/0106867 A1 | 4/2015 | Liang |
| 2015/0143521 A1 | 5/2015 | Eliseev |
| 2015/0154524 A1 | 6/2015 | Borodow |
| 2015/0180891 A1 | 6/2015 | Seward |
| 2015/0215329 A1 | 7/2015 | Singla |
| 2015/0237065 A1 | 8/2015 | Roytman |
| 2015/0264011 A1 | 9/2015 | Liang |
| 2015/0278371 A1 | 10/2015 | Anand |
| 2015/0281278 A1 | 10/2015 | Gooding |
| 2015/0310070 A1 | 10/2015 | Stefik et al. |
| 2015/0319185 A1 | 11/2015 | Kirti |
| 2015/0341389 A1 | 11/2015 | Kurakami |
| 2015/0347751 A1 | 12/2015 | Card et al. |
| 2015/0355957 A1 | 12/2015 | Steiner |
| 2015/0358344 A1 | 12/2015 | Mumcuoglu |
| 2015/0381646 A1 | 12/2015 | Lin |
| 2016/0057166 A1 | 2/2016 | Chesla |
| 2016/0057167 A1 | 2/2016 | Bach et al. |
| 2016/0092535 A1 | 3/2016 | Kuchibhotla et al. |
| 2016/0127391 A1 | 5/2016 | Kobres |
| 2016/0202893 A1 | 7/2016 | Mustonen et al. |
| 2016/0226905 A1 | 8/2016 | Baikalov et al. |
| 2016/0248798 A1 | 8/2016 | Cabrera et al. |
| 2016/0291982 A1 | 10/2016 | Mizrahi |
| 2016/0292061 A1 | 10/2016 | Marron |
| 2016/0337384 A1 | 11/2016 | Jansson |
| 2016/0359886 A1 | 12/2016 | Yadav et al. |
| 2016/0364315 A1 | 12/2016 | Lee |
| 2016/0364571 A1 | 12/2016 | Lee |
| 2016/0364740 A1 | 12/2016 | Parker |
| 2016/0373476 A1 | 12/2016 | Dell'anno et al. |
| 2016/0378978 A1 | 12/2016 | Singla |
| 2016/0381049 A1 | 12/2016 | Lakhani |
| 2017/0004005 A1 | 1/2017 | Elliott |
| 2017/0026400 A1 | 1/2017 | Adams et al. |
| 2017/0031002 A1 | 2/2017 | Newton et al. |
| 2017/0034023 A1 | 2/2017 | Nickolov |

(56) References Cited

U.S. PATENT DOCUMENTS

| | | | |
|---|---|---|---|
| 2017/0070415 A1 | 3/2017 | Bell et al. | |
| 2017/0091008 A1 | 3/2017 | Cherbakov | |
| 2017/0093902 A1* | 3/2017 | Roundy | G06F 21/552 |
| 2017/0148060 A1 | 5/2017 | Showers | |
| 2017/0169217 A1 | 6/2017 | Rahaman | |
| 2017/0251365 A1 | 8/2017 | Burchard | |
| 2017/0270006 A1 | 9/2017 | Kankylas | |
| 2017/0279837 A1 | 9/2017 | Dasgupta | |
| 2017/0287179 A1 | 10/2017 | Tibshirani et al. | |
| 2017/0302685 A1 | 10/2017 | Ladnai et al. | |
| 2017/0308602 A1 | 10/2017 | Raghunathan et al. | |
| 2017/0316026 A1 | 11/2017 | Kanthak et al. | |
| 2017/0322993 A1 | 11/2017 | Brodt et al. | |
| 2017/0324766 A1 | 11/2017 | Gonzalez | |
| 2018/0027002 A1 | 1/2018 | Rodeck et al. | |
| 2018/0027010 A1 | 1/2018 | Pritzkau et al. | |
| 2018/0059876 A1 | 3/2018 | Peng et al. | |
| 2018/0063167 A1 | 3/2018 | Rodeck | |
| 2018/0091535 A1 | 3/2018 | Chrosziel | |
| 2018/0091536 A1 | 3/2018 | Chrosziel et al. | |
| 2018/0173872 A1 | 6/2018 | Lam et al. | |
| 2018/0173873 A1 | 6/2018 | Hassforther et al. | |
| 2018/0176234 A1 | 6/2018 | Kunz et al. | |
| 2018/0176235 A1 | 6/2018 | Lam et al. | |
| 2018/0176238 A1 | 6/2018 | Nos et al. | |
| 2018/0234447 A1 | 8/2018 | Mueen | |
| 2019/0005423 A1 | 1/2019 | Pritzkau et al. | |
| 2019/0007435 A1 | 1/2019 | Pritzkau et al. | |

OTHER PUBLICATIONS

Office Action in related U.S. Appl. No. 15/274,569 dated Apr. 16, 2018; 11 pages.
Office Action in related U.S. Appl. No. 15/246,053 dated May 21, 2018; 14 pages.
Office Action in related U.S. Appl. No. 15/380,379 dated Jul. 19, 2018; 9 pages.
Office Action in related U.S. Appl. No. 15/274,693 dated Jul. 26, 2018; 14 pages.
Office Action in related U.S. Appl. No. 15/383,771 dated Aug. 3, 2018; 12 pages.
Schumacher, "An effective way to bring SAP Security Notes under control," Virtual Forge GmbH, Feb. 2017, https://blog.virtualforge.com/en/an-effective-way-to-bring-sap-security-notes-under-control, 4 pages.
U.S. Office Action in related U.S. Appl. No. 15/216,201 dated Jul. 20, 2018, 15 pages.
U.S. Office Action in related U.S. Appl. No. 15/246,053 dated Sep. 24, 2018, 14 pages.
U.S. Office Action in related U.S. Appl. No. 15/253,438 dated Sep. 19, 2018, 17 pages.
U.S. Office Action in related U.S. Appl. No. 15/274,569 dated Nov. 14, 2018, 11 pages.
U.S. Office Action in related U.S. Appl. No. 15/380,450 dated Aug. 27, 2018, 19 pages.
U.S. Office Action in related U.S. Appl. No. 15/380,450 dated Nov. 2, 2018, 19 pages.
U.S. Office Action in related U.S. Appl. No. 15/380,450 dated Jan. 23, 2019, 21 pages.
U.S. Office Action in related U.S. Appl. No. 15/381,567 dated Nov. 2, 2018, 17 pages.
U.S. Office Action in related U.S. Appl. No. 15/383,771 dated Jan. 23, 2019, 14 pages.
U.S. Office Action in related U.S. Appl. No. 15/383,771 dated Jul. 5, 2019, 16 pages.
Office Action issued in U.S. Appl. No. 15/216,046 dated Aug. 21, 2019, 23 pages.
Final Office Action issued in U.S. Appl. No. 15/274,693 dated Feb. 11, 2019, 19 pages.
Final Office Action issued in U.S. Appl. No. 15/381,567 dated May 22, 2019, 28 pages.
Non-Final Office Action issued in U.S. Appl. No. 15/216,046 dated Apr. 29, 2019, 23 pages.
Non-Final Office Action issued in U.S. Appl. No. 15/246,053 dated May 17, 2019, 28 pages.
Non-Final Office Action issued in U.S. Appl. No. 15/274,569 dated Mar. 22, 2019, 11 pages.
Non-Final Office Action issued in U.S. Appl. No. 15/639,863 dated Jun. 24, 2019, 37 pages.
Office Action issued in U.S. Appl. No. 15/847,478, dated Aug. 6, 2019, 36 pages.

\* cited by examiner

ALERTS BASED ON ENTITIES IN SECURITY INFORMATION AND EVENT MANAGEMENT PRODUCTS

BACKGROUND

Enterprise threat detection (ETD) typically collects and stores a large amount/large sets of log data associated with various heterogeneous computing systems (often referred to as "big data"). The collected log data from source computing systems is extracted as events into an ETD system and analyzed/evaluated using forensic-type data analysis tools to identify suspicious behavior and to allow an appropriate response. Among the central functionalities of ETD is the use of patterns to evaluate extracted events. The patterns specify what event characteristics (such as types, numbers, etc.—for example, if a certain number of failed logon events for a particular user are observed in the system) cause an alert to be raise by the ETD system. However, for the same user, the same type of observation (for example, each time a pattern's criteria is met) can result in various alerts reporting a similar issue, which can result in a large number of false positive alerts. This increases the total cost of ownership (TCO) for the ETD system, as the same effort for closing each alert is required, even if the alert is a false positive.

SUMMARY

The present disclosure describes methods and systems, including computer-implemented methods, computer program products, and computer systems for providing alerts based on entities in security information and event management (STEM) products.

In an implementation, an enterprise threat detection (ETD) pattern is executed against received log event data from one or more computing systems. Using the ETD pattern, an event threshold is determined to have been exceeded. Entities associated with an alert created based on the exceeded threshold are determined and, at runtime, a severity value is calculated for each determined entity associated with the alert. A selection is received of a determined entity on which to perform mitigation action activities. Mitigation action activities associated with the determined entity are written into an activity record data record. A mitigation action activity is closed on the determined entity and a determination performed that all mitigation action activities associated with all entities related to the created alert have been closed. The created alert is closed.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations so as to realize one or more of the following advantages. First, alert processing in SIEM systems (or other systems in which data is analyzed according to certain characteristic and that have a goal to have persons checking and processing the outcome of this analysis) is modified and simplified. Instead of looking into single incidents created during the analysis, the view focuses on entities. Usually, any action taken by the person working on such incidents is performed on entities. With this change, the complete information for an entity is provided. The decision on which action to perform (for example, lock a user, change a user's authorization, shutdown a system, block an IP address at the firewall, etc.) can be taken by looking into an overview about all incidents around this entity. Second, an additional advantage is that the number of incidents is reduced. With single incidents, a similar root cause will create more incidents until the root cause is resolved. With the described methodology, focus is placed on an entity. If the same characteristic, etc. keeps causing incidents, it is seen at the entity level. A decision about an action to perform is taken once and it is no longer required to close all single incidents for an entity. Third, incidents caused by multiple entities can also be handled efficiently (for example, several users were involved, or a user and a computing system were involved). Using the described methodology, the same incident is associated and shown at both entities, allowing a more encompassing decision as to mitigating actions. An activity record keeps information associated with each particular entity. Once all entities of an overall higher-level entity are processed, an incident can be closed automatically. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
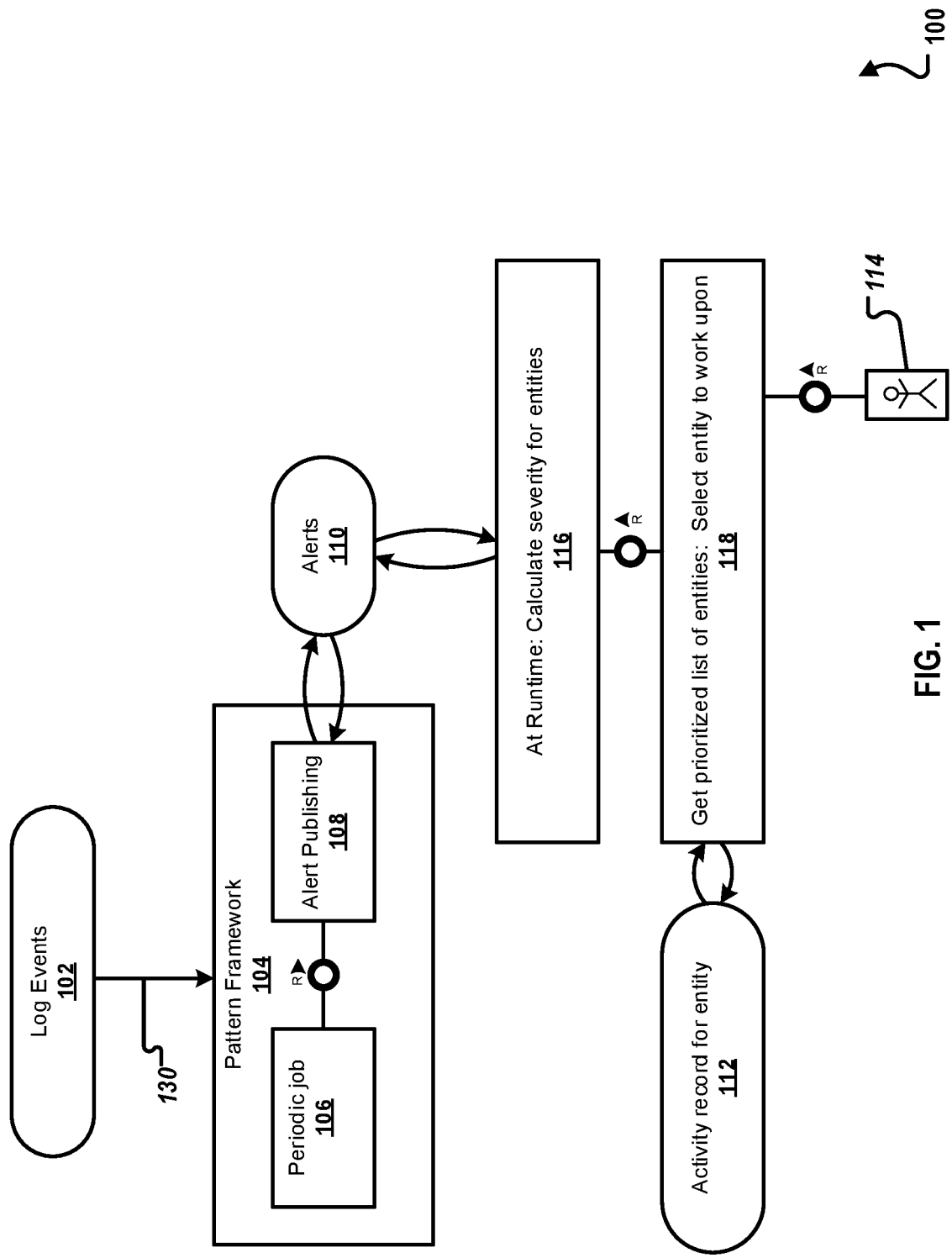
FIG. 1 is a block diagram illustrating an example computer-implemented system for providing alerts based on entities in security information and event management (SIEM) products, according to an implementation.

The following detailed description describes providing alerts based on entities in security information and event management (STEM) products and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein.

Enterprise threat detection (ETD) typically collects and stores a large amount/large sets of log data associated with various heterogeneous computing systems (often referred to as "big data"). The collected log data from source computing systems is extracted as events into an ETD system and analyzed/evaluated using forensic-type data analysis tools to identify suspicious behavior and to allow an appropriate response. Among the central functionalities of ETD is the use of patterns to evaluate extracted events. The patterns specify what event characteristics (such as types, numbers, etc.—for example, if a certain number of failed logon events for a particular user are observed in the system) cause an alert to be raise by the ETD system. However, for the same user, the same type of observation (for example, each time a pattern's criteria is met) can result in various alerts reporting a similar issue, which can result in a large number of false positive alerts. This increases the total cost of ownership (TCO) for the ETD system, as the same effort for closing each alert is required, even if the alert is a false positive.

In current ETD systems, to execute patterns and generated alerts, the following configuration steps are typically performed at design time:

Filter data: Decide which selection criteria applies to available data (for example, by entering a certain event—for a brute force example, failed logon events are of interest). Note that the brute force example will be used throughout this disclosure to aid understanding, but that the disclosure is not limited to the brute force example. Those of ordinary skill in the art will understand that any ETD threat type consistent with this disclosure could be used for example purposed. As such, any ETD threat type is also considered to be within the scope of this disclosure, Define selection criteria (can be complex) and search for correlated data: considering the above-mentioned brute force example, it might be interesting to look only for those failed logon events that: 1) are happening too often and 2) which eventually were followed by a successful logon event (=brute force attack was supposedly successful), Define grouping criteria: Should the data be shown per user, system, or in some other grouping? Several attributes can also be defined for grouping (for example, both users and systems), Define a threshold: When does a situation rise to the level of generating an alert? For the above-mentioned brute force example: a possibility is considering only an excessive number of unsuccessful logon events (defined amount) to be considered an attack (for example, up to three unsuccessful logon events followed by a successful login could mean that a user simply forgot/mistyped their password). However, a large number of rapid, unsuccessful logon events followed by a successful logon event, could trigger a single successful login to be suspected of being a successful brute force attack, Define execution frequency (or mode): Either execute a pattern in a periodic job, or define an execution "trigger" (for example, if a certain event arrives in the system, or if another pattern exceeded its defined threshold, trigger another pattern to execute as well), and Enter information about the expected severity of the attack.

With the above-defined configuration, alert creation is chronological. If events possess one or more particular characteristics, an alert is created, and someone (for example, the Monitoring Agent) looks at the created alert to decide how to handle the created alert. A pattern execution will create an alert in case a filter results in sufficient events to exceed a given threshold. The alert is shown to a Monitoring Agent (for example, a person processing alerts or an automated algorithmic process) and the Monitoring Agent can start a workflow to manage the created alert. Some logic applies in order to prevent several alerts to be created for the same event selection. For example, if a pattern looks for a single event within a one-hour timeframe, but the pattern runs every ten minutes, then the single event could be seen up to six times (instead of ignored for the last five pattern executions).

To correct this example issue (and other ETD issues), a high-level methodology to accumulate information from pattern executions into entity data records, and show the accumulated information per entity:

Run patterns as previously described.

Instead of creating alerts from singular pattern executions, accumulate the pattern results into entities. Appropriate entities are (might be subject to configuration):
Users
Systems
IP addresses
Etc.

The Alert Monitor looking into the threat situation usually has to decide which action to take on a user, system, or other entity. By now looking into the entity itself, the Alert Monitor can directly see all aspects that need to be known for this entity (permitting a decision about a severity of the action (for example, notify, block, or shutdown an entire system) can be made holistically.

As a result, new views are created, for example:

Users: Enrich users with results from pattern executions
According to pattern severity, accumulation of information can be performed with a certain "weight"—adding up to a determined weighting score, and
Users with up to date threat information or with the most accumulated information (for example, a highest weighting score) can be considered of higher priority and shown at the beginning of a list as designated users with higher priority. In some implementations, these users can be designated in different colors, font, with a data flag, etc. to draw attention to the Alert Monitor.

Similar functions can be performed on systems, or any other relevant entities (for example, users, IP addresses, etc.).

In the new methodology, alert processing reflects a more natural form of alert processing (that is, the Alert Monitor typically must also decide about what to do for a user, system, or other entity). Generated alerts are not shown chronologically, but instead as an up-to-date list of entities. In typical implementations, this change requires at least:

A new data model for accumulated threat information per entity,

A definition per pattern of which entities will be enriched by an outcome,

The list of entities will be calculated by an accumulation of current pattern execution results, Listing critical entities with the up-to-date threat information at the beginning of an alert list, and Performing activities not on basis of chronological single alerts (unless an alert is so important that it alone forces an entity to the beginning of the alert list), but based on entities. Scenarios based on entities can be developed and used for analysis. For example, referring to the above-mentioned brute force example, focus becomes on issues per system (or even network segment, etc.) when starting an overall analysis. An outcome could be, for example, to locate a source IP address of brute force attack attempts and to block the source IP address at a firewall. In another example, where a user is a source of a brute force attack, the outcome scenario can be to not block the source IP address but to lock or change the authorization of a particular user identification (userID) suspected of being maliciously used for the brute force attack out of a computing system to proactively prevent a suspected brute force from being successfully completed with the particular userID. In this scenario, the userID can keep trying, but be unaware that the user has been locked. Efforts to trace the brute force attack can then be executed while the particular userID has been locked.

A decision is made as to which entity (for example, a user, a system, an IP address, and the like) should be processed by the Monitoring Agent. Patterns look for events with a certain characteristic are still executed, but when a certain pattern characteristic is met, no singular alert is raised, but instead the underlying entity (for example, a particular user, is enriched with information. More than one entity can also be enriched (for example, for a brute force attack: a hacker tries to intrude into a system landscape by attempting a brute force attack on several systems): In this case, all potential target systems can be enriched with the information (such as, "someone tried to get access by brute force"). However, the Monitoring Agent will no longer have an unstructured list of "brute force" alerts in its inbox. Instead, the Monitoring Agent's information can be similar to:

System view: Using the brute force example, systems where brute force alerts accumulate receive higher visibility. Systems with the highest visibility are indicted (for example, location, color, font, etc.) as those that should be processed with priority, Topic view: Continuing with the brute force example, patterns/topics with most occurrences (also possibly including a priority score) receive higher visibility, and Note that other views are possible depending upon particular configurations. These possible views, in as much as they are consistent with this disclosure, are considered to be within the scope of this disclosure.

General pattern execution from current implantations is retained (for example, filtering of the data, defining of thresholds, groupings, execution frequency or mode). However, changes to current implementations include:

New configuration step: Define at design time which entity is supposed to be updated with the information from a particular pattern should an alert be raised due to an exceeded threshold. For example, suppose a brute force attack is originating from a particular IP address. The attacker tries a standard (simple) password, for example, "123456" for all users of a system. In this case, the relevant entity would be the IP address as originator of the attack. The action of the Monitoring Agent could be to put this IP address on a blacklist to block any future requests from this IP address at an intervening firewall. Although the users created the unsuccessful logon event, no action on these users would help to stop the attack—after all, it was not the users who did something malicious, but the IP address. In this way, the users could still log into the system but the attacker can be stopped. In general, the maintained entity will indicate on what entity the Monitoring Agent will have to work in order to stop the attack. This could be any event attribute that can have a role in an event (for example, an actor, intermediate, target, or another role). With this information, current pattern execution can be maintained and alerts can still be produced.

New step: Instead of working on alerts, the Monitoring Agent works directly on entities. This requires a calculation of alert information per entity. If an alert is raised for an entity (for example, for an IP address in the above-described brute force example, or a user who extended his own privileges and was detected to access resources or executables that he is not permitted to use, the entity will be identified to the Monitoring Agent). Note that some alerts can be related to several entities. In this case, the new calculation will bring up necessary action items for each related entity.

Additional new aspect: Suppose a user performed several activities that raised alerts. For example, first, a user debugs and changes a variable during debugging→ Alert 1 is created. Then the user assigns critical level authorizations (for example, "ALL_AUTHORIZATIONS") to his user to obtain all authorizations in a productive system→ Alert 2 is created. Finally, the user executes a critical function that is monitored in a pattern→ Alert 3 is created. In current implementations, a Monitoring Agent will receive one alert for each of these actions and will have to look into perform actions related to this user multiple times. With the described methodology, the Monitoring Agent will work on this user as an entity and will see information about all alerts (here, Alerts 1, 2, and 3) simultaneously. The Monitoring Agent has a more efficient and compact overview of ETD activities and an improved basis for use in deciding which mitigating actions to perform in relation to the entity.

For auditing purposes, any actions of a Monitoring Agent are documented in the ETD system. However, instead of updating the status on the alert directly, a new Activity Record is written which refers to an entity on which the Monitoring Agent worked. The Activity Record contains a reference to all alerts that showed incidents for this entity. This means that information seen by the Monitoring Agent at the time when the entity is processed is visible for auditing purposes. Additionally, the Activity Record contains information on what mitigating actions the Monitoring Agent performed, and the processing status/disposition of the entity in question. After the Monitoring Agent has performed mitigating activity, since the entity-based alert contains information of all affected entities, the alert can be closed as soon as Monitoring Agent activity records show a final (for example, "CLOSED," "COMPLETE," etc.) status on all affected entities.

FIG. 1 is a block diagram illustrating an example computer-implemented system 100 for providing alerts based on entities in security information and event management (SIEM) products, according to an implementation. System 100 includes log events 102 associated with log data of one or more computing systems (not illustrated). The log events are received by a pattern framework 104 over a network connection 130. Note that while only one connection in system 100 is designated as network 130, any other illustrated connection can be considered to be part of network 130 or other network. For additional detail related to FIG. 1, please refer to FIG. 3.

The pattern framework 104 processes the received log events 102 using a periodic job (for example, analyzing log events 102 against ETD patterns (not illustrated) accessible by the pattern framework 104 every one minute, three minutes, etc.). In some implementations, the pattern framework 104 can also be manually triggered or triggered based on the execution of other patterns (to cause additional patterns to be executed to perform additional analysis). In some implementations, if a threshold is exceeded while executing a particular pattern, an alert publishing component 108 creates an alert and writes the created alert into an alert 110 data store. In other implementations or in combination with the above described threshold-based patterns, pattern executions are also possible based on anomalies. For example, an anomaly pattern can compare current behavior of an entity with an average behavior of the same entity in the past. As one specific example, the anomaly pattern can be used to analyze how often a user performed a certain activity during a particular hour and compare the analysis results against an average number of similar activities during the same hour during a last twelve-week period of time. Such as a bank accountant needing to look into customer accounts and performing a certain activity. The accountant usually works on twenty accounts per hour. However, suddenly today from 2-3 pm, the accountant processed 200 accounts. This is ten times as many accounts as usually processed, and could indicate that the accountant is collecting personal/financial information for malicious purposes (such as, information disclosure about a certain group of people, credit card fraud, identity theft, etc.).

At 118, a Monitoring Agent 114 receives a list of prioritized entities associated with the created alert. A severity for each entity was calculated at 116 at runtime. For example, the calculated severity can be used to prioritize the entities in 118. The Monitoring Agent 114 selects an entity to work with (for example, the highest priority entity as displayed in a Graphical User Interface (GUI) list).

The Monitoring Agent 114 performs mitigating actions on the selected entity. An activity record 112 is generated for the actions of Monitoring Agent 114 to permit, for example, compliance monitoring and auditing.

Figure 2:
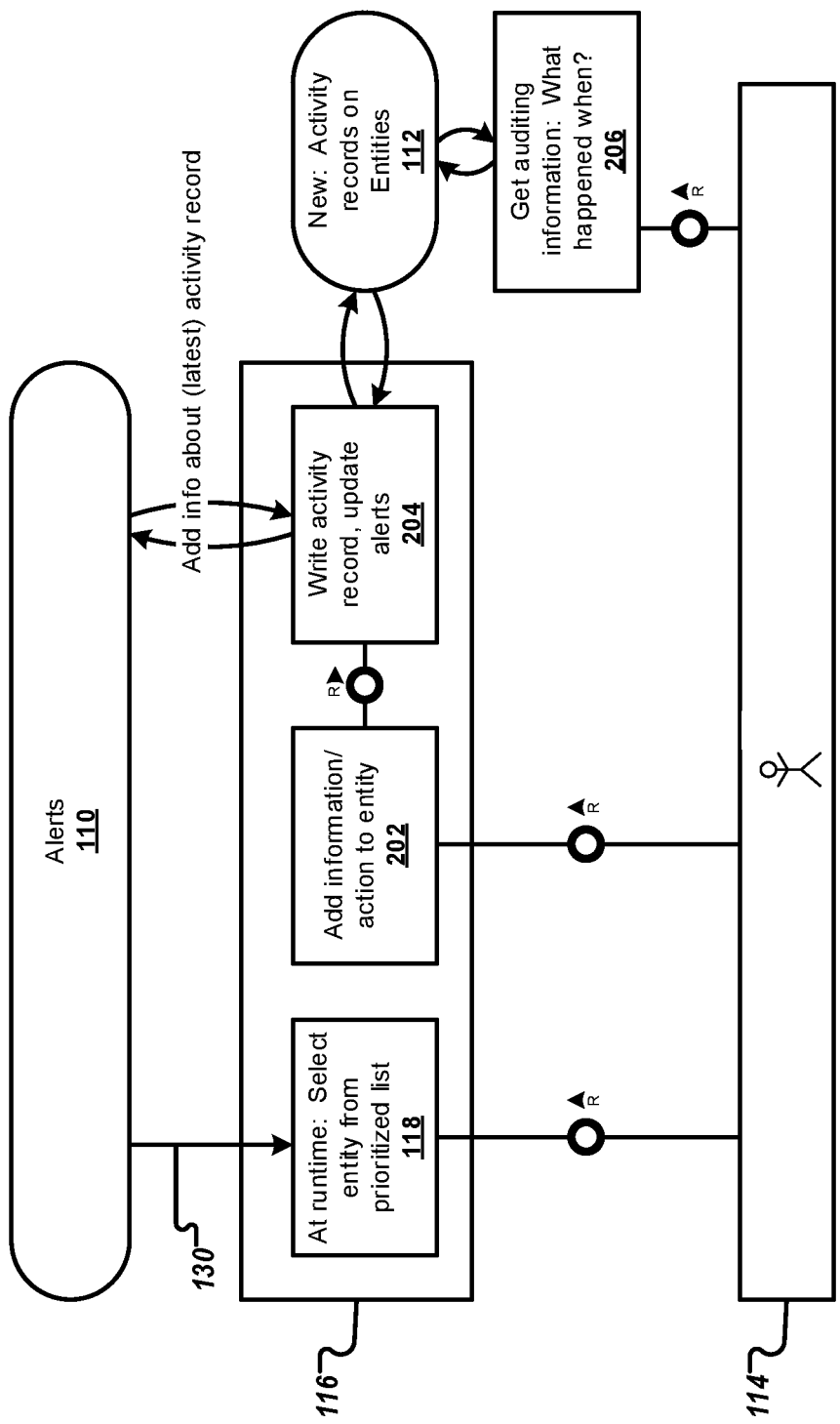
FIG. 2 is a block diagram illustrating a detailed view 200 of the example computer-implemented system of FIG. 1 for providing alerts based on entities in SIEM products, according to an implementation.

FIG. 2 is a block diagram illustrating a detailed view 200 of the example computer-implemented system 100 of FIG. 1 for providing alerts based on entities in SIEM products, according to an implementation. Note that while only one connection in system 100/view 200 is designated as network 130, any other illustrated connection can be considered to be part of network 130 or other network. FIG. 2 focuses on components from Alerts 110 and following of FIG. 1. For additional detail related to FIG. 2, please refer to FIG. 3. Note that FIG. 2 shows some components of FIG. 1 (for example, 118) combined into component 116. As will be appreciated by those of ordinary skill in the art, this illustration is only one possible implementation of the described system and should not be considered to limit the implementations only to the described implementation. Other implementations consistent with this disclosure are considered to be within the scope of this disclosure.

In FIG. 2, at 118, a Monitoring Agent 114 receives a list of prioritized entities associated with a created alert (refer to FIG. 1 for detail). A severity for each entity was calculated at 116 at runtime. For example, the calculated severity can be used to prioritize the entities in 118. The Monitoring Agent 114 selects an entity to work with (for example, the highest priority entity as displayed in a Graphical User Interface (GUI) list).

The Monitoring Agent 114 performs mitigating actions on the selected entity. At 202, information on the Monitoring Agent 114, actions performed with respect to the selected entity, and other information is written to an activity record for the particular selected prioritized entity. As shown to FIG. 2, an activity record and alert update is performed by component 204—where the described information is written to an activity record in an activity record 112 data store and information about the activity record is also added to one or more alerts in the alert 110 data store. An activity record 112 is generated for the actions of Monitoring Agent 114 to permit, for example, compliance monitoring and auditing.

Component 206 permits the Monitoring Agent 114 or other user to retrieve auditing (or other) information related to activity records from the activity records 112 data store. For example, a regulatory auditor may wish to audit activities a particular Monitoring Agent 114 took with respect to a particular created alert associated with a user x. Monitoring Agent 114 could ascertain what happened, when, what actions were taken, what was the final dispensation of created alerts, and the like.

Figure 3:
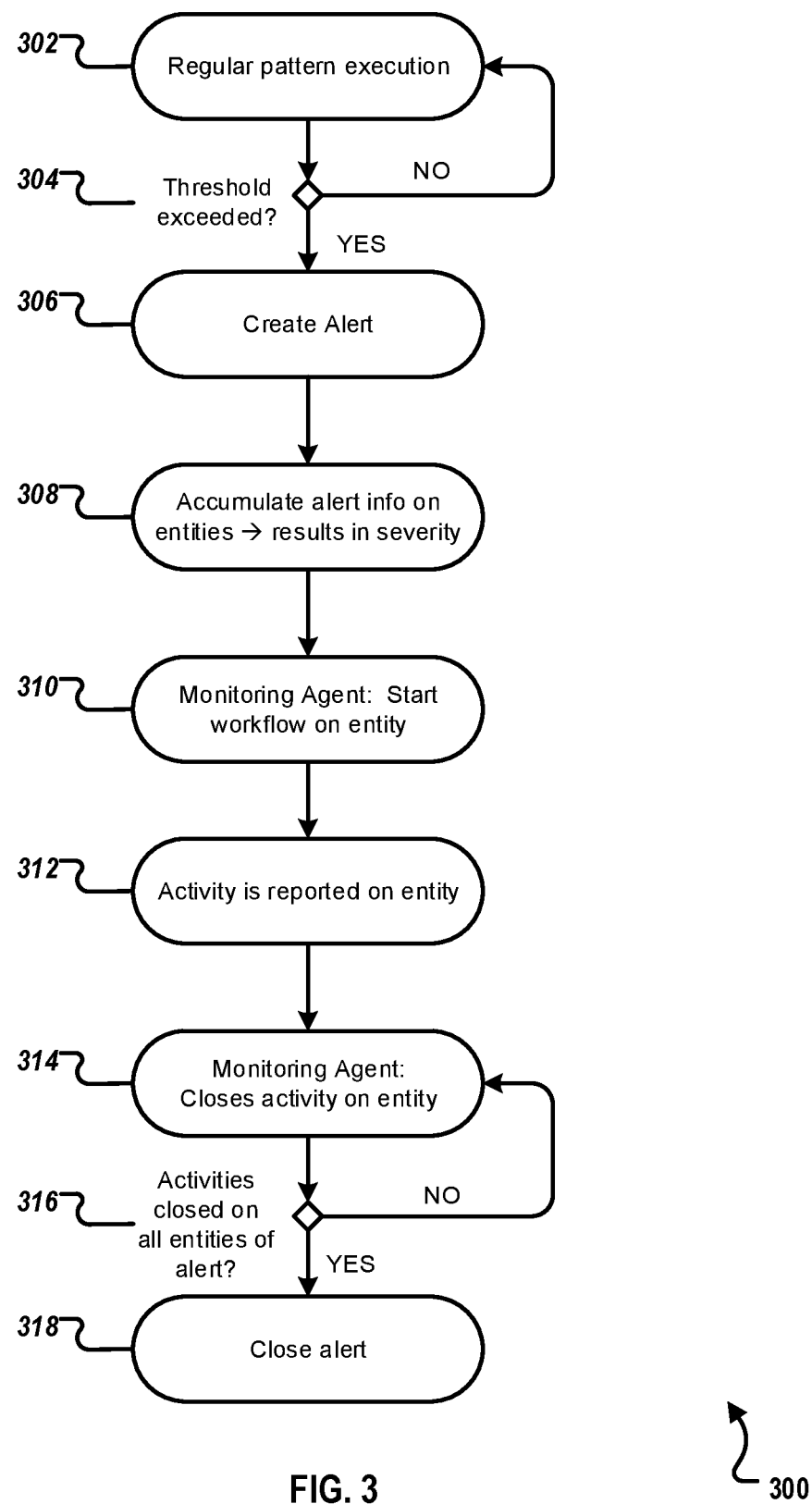
FIG. 3 is a flowchart illustrating an example method for providing alerts based on entities in SIEM products, according to an implementation.

FIG. 3 is a flowchart illustrating an example method 300 for providing alerts based on entities in SIEM products, according to an implementation. For clarity of presentation, the description that follows generally describes method 300 in the context of the other figures in this description. However, it will be understood that method 300 may be performed, for example, by any suitable system, environment, software, and hardware, or a combination of systems, environments, software, and hardware as appropriate. In some implementations, various steps of method 300 can be run in parallel, in combination, in loops, or in any order.

At 302, an ETD pattern is executed. In typical implementations, ETD patterns work as: for given filter criteria, a given timeframe (for example, "Last hour"), a given frequency (for example, "every three minutes"), a given grouping (for example, "per user and system") and selection criteria (for example, a total number of events for filter & group criteria, or a number of distinct values for filter and group criteria), the ETD system counts whether the given threshold of events was exceeded. For example, whether there were more than ten failed logon events for the same user in the same system (here, one perspective of the above-described brute force example). Note, as described above, that other patterns (for example, anomaly patterns) can use statistical (or other analysis) methods, such as "user x logs onto system y three times a day over an average of twelve weeks; if the user x now logs onto system y ten times on a particular day, this deviates significantly from the statistic average and can be considered an anomaly, and an alert is raised. From 302, method 300 proceeds to 304.

At 304, if it is determined that the threshold was exceeded, method 300 proceeds to 306. If it is determined that a threshold is not exceeded, method 300 proceeds back to 302. Note that the threshold can be an absolute threshold in a regular pattern (such as "ten" in the preceding brute force example), or a relative threshold calculated by statistical methods (such as "three" as the average given above). Exceeding a threshold (absolute or relative) results in raising an ETD alert.

At 306, an alert is created. A Monitoring Agent (for example, a person processing alerts or an automated algorithmic process) analyzes the created alert. From 306, method 300 proceeds to 308.

At 308, alert information is accumulated for associated entities. Alerts contain information on affected entities. By evaluating the alerts, it is possible to determine all alerts in which user x, or system y, or another entity z, etc. are involved. All alerts are displayed along with an associated entity as a leading entry point. For user x, all information of alerts in which user x is involved is collected (and similarly for system y). Focusing on system y, as alerts can contain more than one entity type (for example, a user and a system), or several entities of the same type (for example, several users), such alerts will be shown associated with all relevant entities. For example, an alert raised for user x and system y will be shown both with the user x system y entities.

With respect to severity: different approaches can be considered. One aspect could be, for example, "more alerts for an entity=higher severity." While currently ETD patterns are configured with a severity, in the described methodology, all alerts for an entity could be evaluated and an average severity calculated, a highest appearing severity from the patterns "wins" (for example, for user x, three alerts such as brute force attack with high severity, debug activity with medium severity, and user activity in development system with low severity occurred. The average severity would maybe be medium. The highest severity would be high), or some other severity determination method consistent with this disclosure. For example, calculation rules (not illustrated) could be defined to determine severity or a Monitoring Agent could determine severity based on a preference, guideline, etc. From 308, method 300 proceeds to 310.

At 310, the Monitoring Agent starts a mitigating action workflow on an entity or entities. In current ETD implementations, the Monitoring Agent reviews a list of alerts (for example on a GUI) that were generated by one or more patterns and decides which alert to start with. For example, the "picking" of an alert currently changes the status from "new" to "in process" (and the picked alert does not appear in a general list any longer) and processor information is associated with the alert. Once the Monitoring Agent has decided what mitigating action to perform on the alert, the Monitoring Agent changes the status and/or the processor of the alert. In current ETD implementations, activities on alerts are reported within the alert itself. Every alert has at least a status field and a processor field.

However, with the described methodology, the monitoring agent instead reviews a list of entities to decide on which entity to perform mitigating actions (for example, to lock user x or to shutdown system y) on first. For example, the list of entities could be generated by using a view (such as, "show me the current list of users for whom alerts exist" or "show me systems"/"show me<other entity>") or by showing all entities in one list (where the list could list user x1, user x2, system y, IP address z, . . . , etc. in a list). From 310, method 300 proceeds to 312.

At 312, activity performed by the Monitoring Agent is reported on the entity (documented in the system in an activity record data record. Such a data record is needed, for example, for procedural, quality, legal, regulatory, compliance, and other reasons—where an auditor would want to be able to analyze what was done and for which reasons). In some implementations, Monitoring Agent activities can also be used to update the underlying alerts (created at 306). From 312, method 300 proceeds to 314.

At 314, the Monitoring Agent closes activity on the entity. At this point, the Monitoring Agent has analyzed the entity and performed all necessary mitigating steps. The entity should be in a state that is "correct" from security perspective (for example, for a user: Contains adequate authorization and validity, or maybe this user is supposed to be locked so the user can do no further harm, or a system's settings have been changed to increase overall system security, etc.). The entity can be removed from the work list. Until other incidents around the entity appear, no further action items are required for the entity. From 314, method 300 proceeds to 316.

At 316, a determination is made as to whether activities have been closed for all entities related to a raised alert. If it is determined that activities have not been closed for all entities related to a raised alert, method 300 proceeds back to 314. If it is determined that activities have been closed for all entities related to a raised alert, method 316 proceeds to 318. As an example, if all entities that were involved in an alert have been processed in 312 and 314, the underlying alert can be closed (typically automatically). If, for example, an alert was opened for users x1 and x2, and user x1 was processed, but user x2 has still not been processed, then the alert would remain open. Only after user x2 is processed, would all entities for this alert—users x1 and x2 be considered closed. If performed automatically, no human interaction is needed, and the closing can efficiently be performed by the ETD system.

At 318, the created alert is closed. In typical implementations, the alert is closed automatically. In some implementations, the alert can be closed manually (for example, a Monitoring Agent or other user wishes to directly update an alert). If an activity on an entity (such as in 310-314) is performed that automatically leads to closing an alert, an automatic process could find an alert that was already closed manually and consider this a valid state. After 318, method 300 stops.

Figure 4:
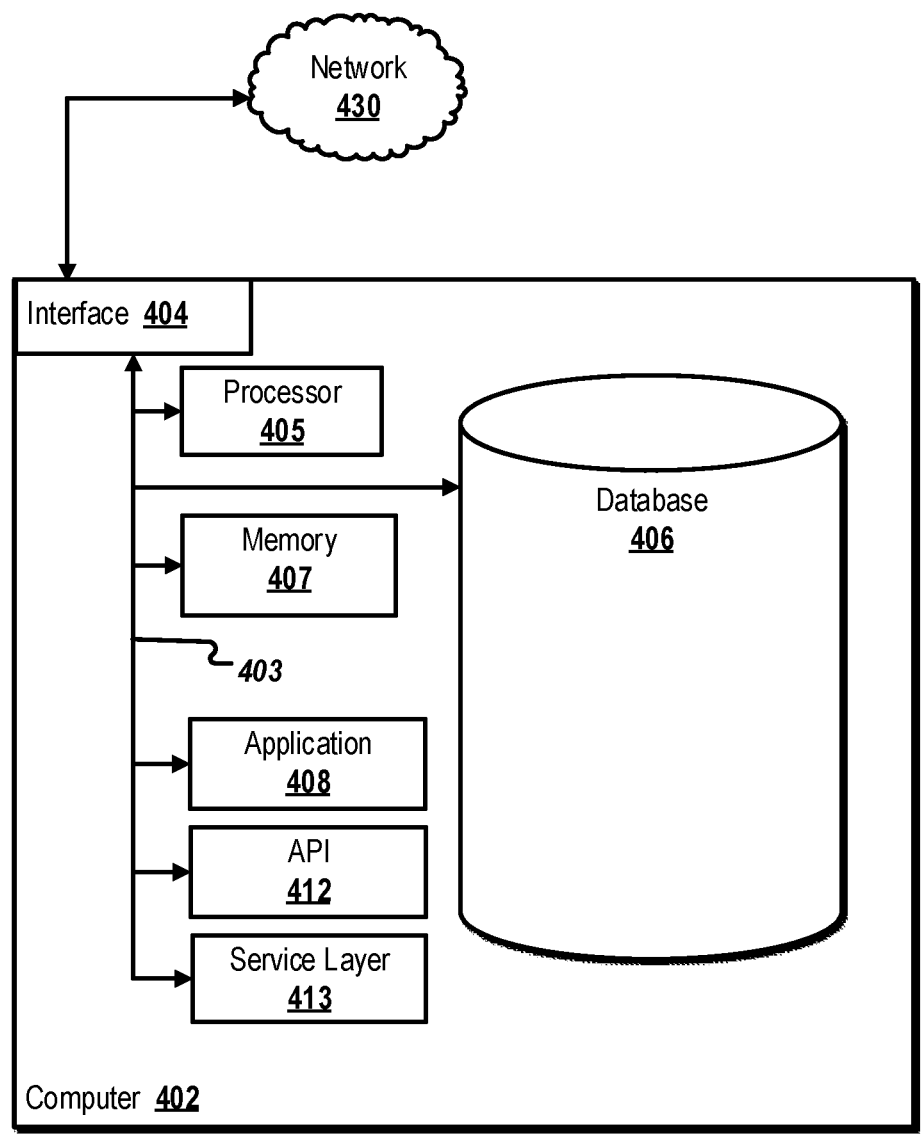
FIG. 4 is a block diagram illustrating an exemplary computer system used to provide computational functionalities associated with described algorithms, methods, functions, processes, flows, and procedures as described in the instant disclosure, according to an implementation.

FIG. 4 is a block diagram illustrating an exemplary computer system used to provide computational functionalities associated with described algorithms, methods, functions, processes, flows, and procedures as described in the instant disclosure, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical user interface (GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430 (for example, network 130). In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, or other server (or a combination of servers).

The computer 402 can receive requests over network 430 from a client application (for example, executing on another computer 402) and responding to the received requests by processing the said requests in an appropriate software application. In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment that are connected to the network 430 (whether illustrated or not). Generally, the interface 404 comprises logic encoded in software or hardware (or a combination of software and hardware) and operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a database 406 that can hold data for the computer 402 or other components (or a combination of both) that can be connected to the network 430 (whether illustrated or not). For example, database 406 can be an in-memory, conventional, or other type of database storing data consistent with this disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, in alternative implementations, database 406 can be external to the computer 402. For example, database 406 can be used to store alerts, activity records, and any other data discussed in this disclosure or consistent with this disclosure.

The computer 402 also includes a memory 407 that can hold data for the computer 402 or other components (or a combination of both) that can be connected to the network 430 (whether illustrated or not). For example, memory 407 can be random access memory (RAM), read-only memory (ROM), optical, magnetic, and the like storing data consistent with this disclosure. In some implementations, memory 407 can be a combination of two or more different types of memory (for example, a combination of RAM and magnetic storage) according to particular needs, desires, or particular implementations of the computer 402 and the described functionality. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in this disclosure. For example, application 408 can serve as one or more components, modules, applications, etc. Further, although illustrated as a single application 408, the application 408 may be implemented as multiple applications 407 on the computer 402. In addition, although illustrated as integral to the computer 402, in alternative implementations, the application 408 can be external to the computer 402.

There may be any number of computers 402 associated with, or external to, a computer system containing computer 402, each computer 402 communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

Described implementations of the subject matter can include one or more features, alone or in combination.

For example, in a first implementation, a computer-implemented method, comprising: executing an enterprise threat detection (ETD) pattern against received log event data from one or more computing systems; determining, using the ETD pattern, that an event threshold has been exceeded; determining entities associated with an alert created based on the exceeded threshold; calculating, at runtime, a severity value for each determined entity associated with the alert; receiving a selection of a determined entity on which to perform mitigation action activities; writing mitigation action activities associated with the determined entity into an activity record data record; closing a mitigation action activity on the determined entity; determining that all mitigation action activities associated with all entities related to the created alert have been closed; and closing the created alert.

The foregoing and other described implementations can each optionally include one or more of the following features:

A first feature, combinable with any of the following features, wherein the threshold is defined as an absolute value or determined relatively using statistical methods.

A second feature, combinable with any of the previous or following features, comprising writing the created alert into an alert data store.

A third feature, combinable with any of the previous or following features, wherein entities include at least one of a user or a computing system.

A fourth feature, combinable with any of the previous or following features, comprising initiating display of a list of the determined entities prioritized by the severity calculated for each determined entity.

A fifth feature, combinable with any of the previous or following features, comprising writing information about the latest activity data record associated with the determined entity to the alert stored in an alert data store.

A sixth feature, combinable with any of the previous or following features, wherein closing the created alert can be performed manually or automatically.

In a second implementation, a non-transitory, computer-readable medium storing one or more instructions executable by a computer system to perform operations comprising: executing an enterprise threat detection (ETD) pattern against received log event data from one or more computing systems; determining, using the ETD pattern, that an event threshold has been exceeded; determining entities associated with an alert created based on the exceeded threshold; calculating, at runtime, a severity value for each determined entity associated with the alert; receiving a selection of a determined entity on which to perform mitigation action activities; writing mitigation action activities associated with the determined entity into an activity record data record; closing a mitigation action activity on the determined entity; determining that all mitigation action activities associated with all entities related to the created alert have been closed; and closing the created alert.

The foregoing and other described implementations can each optionally include one or more of the following features:

A first feature, combinable with any of the following features, wherein the threshold is defined as an absolute value or determined relatively using statistical methods.

A second feature, combinable with any of the previous or following features, further comprising one or more instructions to write the created alert into an alert data store.

A third feature, combinable with any of the previous or following features, wherein entities include at least one of a user or a computing system.

A fourth feature, combinable with any of the previous or following features, comprising one or more instructions to initiate display of a list of the determined entities prioritized by the severity calculated for each determined entity.

A fifth feature, combinable with any of the previous or following features, comprising one or more instructions to write information about the latest activity data record associated with the determined entity to the alert stored in an alert data store.

A sixth feature, combinable with any of the previous or following features, wherein closing the created alert can be performed manually or automatically.

In a third implementation, a computer-implemented system, comprising: a computer memory; and a hardware processor interoperably coupled with the computer memory and configured to perform operations comprising: executing an enterprise threat detection (ETD) pattern against received log event data from one or more computing systems; determining, using the ETD pattern, that an event threshold has been exceeded; determining entities associated with an alert created based on the exceeded threshold; calculating, at runtime, a severity value for each determined entity associated with the alert; receiving a selection of a determined entity on which to perform mitigation action activities; writing mitigation action activities associated with the determined entity into an activity record data record; closing a mitigation action activity on the determined entity; determining that all mitigation action activities associated with all entities related to the created alert have been closed; and closing the created alert.

The foregoing and other described implementations can each optionally include one or more of the following features:

A first feature, combinable with any of the following features, wherein the threshold is defined as an absolute value or determined relatively using statistical methods.

A second feature, combinable with any of the previous or following features, further configured to write the created alert into an alert data store.

A third feature, combinable with any of the previous or following features, wherein entities include at least one of a user or a computing system.

A fourth feature, combinable with any of the previous or following features, further configured to initiate display of a list of the determined entities prioritized by the severity calculated for each determined entity.

A fifth feature, combinable with any of the previous or following features, further configured to write information about the latest activity data record associated with the determined entity to the alert stored in an alert data store.

A sixth feature, combinable with any of the previous or following features, wherein closing the created alert can be performed manually or automatically.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   executing an enterprise threat detection (ETD) pattern against received log event data from one or more computing systems;
   determining, using the ETD pattern, that an event threshold has been exceeded;
   determining affected entities associated with an alert created based on the exceeded threshold, the alert comprising information accumulated for the affected entities;
   calculating, at runtime, a severity value of the alert relative to the ETD pattern for each determined entity associated with the alert, the severity value being associated with one or more activity types included in the received log event data;
   receiving a selection of a determined entity on which to perform mitigation action activities;
   writing mitigation action activities associated with the determined entity into an activity record data record;
   closing a mitigation action activity on the determined entity;
   determining that all mitigation action activities associated with all entities related to the created alert have been closed; and
   closing the created alert.

2. The computer-implemented method of claim 1, wherein the threshold is defined as an absolute value or determined relatively using statistical methods.

3. The computer-implemented method of claim 1, comprising writing the created alert into an alert data store.

4. The computer-implemented method of claim 1, wherein entities include at least one of a user or a computing system.

5. The computer-implemented method of claim 1, comprising initiating display of a list of the determined entities prioritized by the severity calculated for each determined entity.

6. The computer-implemented method of claim 1, comprising writing information about the latest activity data record associated with the determined entity to the alert stored in an alert data store.

7. The computer-implemented method of claim 1, wherein closing the created alert can be performed manually or automatically.

8. A non-transitory, computer-readable medium storing one or more instructions executable by a computer system to perform operations comprising:
    executing an enterprise threat detection (ETD) pattern against received log event data from one or more computing systems;
    determining, using the ETD pattern, that an event threshold has been exceeded;
    determining affected entities associated with an alert created based on the exceeded threshold, the alert comprising information accumulated for the affected entities;
    calculating, at runtime, a severity value of the alert relative to the ETD pattern for each determined entity associated with the alert, the severity value being associated with one or more activity types included in the received log event data;
    receiving a selection of a determined entity on which to perform mitigation action activities;
    writing mitigation action activities associated with the determined entity into an activity record data record;
    closing a mitigation action activity on the determined entity;
    determining that all mitigation action activities associated with all entities related to the created alert have been closed; and
    closing the created alert.

9. The non-transitory, computer-readable medium of claim 8, wherein the threshold is defined as an absolute value or determined relatively using statistical methods.

10. The non-transitory, computer-readable medium of claim 8, further comprising one or more instructions to write the created alert into an alert data store.

11. The non-transitory, computer-readable medium of claim 8, wherein entities include at least one of a user or a computing system.

12. The non-transitory, computer-readable medium of claim 8, comprising one or more instructions to initiate display of a list of the determined entities prioritized by the severity calculated for each determined entity.

13. The non-transitory, computer-readable medium of claim 8, comprising one or more instructions to write information about the latest activity data record associated with the determined entity to the alert stored in an alert data store.

14. The non-transitory, computer-readable medium of claim 8, wherein closing the created alert can be performed manually or automatically.

15. A computer-implemented system, comprising:
    a computer memory; and
    a hardware processor interoperably coupled with the computer memory and configured to perform operations comprising:
    executing an enterprise threat detection (ETD) pattern against received log event data from one or more computing systems;
    determining, using the ETD pattern, that an event threshold has been exceeded;
    determining affected entities associated with an alert created based on the exceeded threshold, the alert comprising information accumulated for the affected entities;
    calculating, at runtime, a severity value of the alert relative to the ETD pattern for each determined entity associated with the alert, the severity value being associated with one or more activity types included in the received log event data;
    receiving a selection of a determined entity on which to perform mitigation action activities;
    writing mitigation action activities associated with the determined entity into an activity record data record;
    closing a mitigation action activity on the determined entity;
    determining that all mitigation action activities associated with all entities related to the created alert have been closed; and
    closing the created alert.

16. The computer-implemented system of claim 15, wherein the threshold is defined as an absolute value or determined relatively using statistical methods.

17. The computer-implemented system of claim 15, further configured to write the created alert into an alert data store.

18. The computer-implemented system of claim 15, wherein entities include at least one of a user or a computing system.

19. The computer-implemented system of claim 15, further configured to:
    initiate display of a list of the determined entities prioritized by the severity calculated for each determined entity; and
    write information about the latest activity data record associated with the determined entity to the alert stored in an alert data store.

20. The computer-implemented system of claim 15, wherein closing the created alert can be performed manually or automatically.

* * * * *